US010840792B2

(12) United States Patent
Kao et al.

(10) Patent No.: US 10,840,792 B2
(45) Date of Patent: Nov. 17, 2020

(54) ELECTROMAGNETIC DRIVING MECHANISM

(71) Applicant: TDK TAIWAN CORP., Yangmei Taoyuan (TW)

(72) Inventors: Kuo-Chun Kao, Yangmei Taoyuan (TW); Nai-Wen Hsu, Yangmei Taoyuan (TW); Shih-Ting Huang, Yangmei Taoyuan (TW); Yi-Hsin Nieh, Yangmei Taoyuan (TW); Meng-Ting Lin, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 332 days.

(21) Appl. No.: 15/935,465

(22) Filed: Mar. 26, 2018

(65) Prior Publication Data

US 2018/0287478 A1   Oct. 4, 2018

Related U.S. Application Data

(60) Provisional application No. 62/478,193, filed on Mar. 29, 2017.

(30) Foreign Application Priority Data

Mar. 7, 2018   (CN) .......................... 2018 1 0188767

(51) Int. Cl.
*H02K 41/03*   (2006.01)
*H02K 41/035*   (2006.01)
(Continued)

(52) U.S. Cl.
CPC .......... *H02K 41/0356* (2013.01); *G03B 3/10* (2013.01); *G03B 5/00* (2013.01); *G03B 17/02* (2013.01); *G03B 13/36* (2013.01); *G03B 2205/00* (2013.01); *G03B 2205/0069* (2013.01); *H02K 11/215* (2016.01); *H02K 2211/03* (2013.01)

(58) Field of Classification Search
CPC .............. H02K 41/035; H02K 11/215; H02K 41/0356; H02K 2211/03; G03B 5/00; G03B 3/10; G03B 17/02; G03B 2205/0069; G03B 13/36; G03B 2205/00
See application file for complete search history.

(56) References Cited

U.S. PATENT DOCUMENTS

2012/0026611 A1\*   2/2012   Hu ...................... H02K 41/0356
                                                                    359/824
2015/0076934 A1\*   3/2015   Jang ........................ H02K 5/08
                                                                    310/43

(Continued)

*Primary Examiner* — Naishadh N Desai
(74) *Attorney, Agent, or Firm* — Muncy, Geissler, Olds & Lowe, PC (57) ABSTRACT

An electromagnetic driving mechanism is provided, including a housing, a circuit unit, an electromagnetic driving assembly, and a sensing element. The circuit unit is connected to the housing, and has a plastic material and a circuit element. The plastic material is formed on and covers an outer surface of the circuit element by insert molding. The electromagnetic driving assembly is disposed in the housing for forcing an optical element to move relative to the circuit unit. The sensing element is disposed on the circuit unit, and electrically connected to the circuit element for detecting the displacement of the optical element relative to the circuit unit.

19 Claims, 11 Drawing Sheets

(51) Int. Cl.
  *G03B 5/00*     (2006.01)
  *G03B 3/10*     (2006.01)
  *G03B 17/02*    (2006.01)
  *H02K 11/215*   (2016.01)
  *G03B 13/36*    (2006.01)

(56) References Cited

U.S. PATENT DOCUMENTS

2015/0212293 A1* 7/2015 Bang .................. G02B 13/0015
                                                  348/360
2015/0331251 A1* 11/2015 Hu .................... H02K 41/0356
                                                  359/824
2016/0299350 A1* 10/2016 Hu ....................... G02B 27/646

\* cited by examiner

ELECTROMAGNETIC DRIVING MECHANISM

CROSS REFERENCE TO RELATED APPLICATIONS

This application claims the benefit of U.S. Provisional Application No. 62/478,193, filed Mar. 29, 2017, and claims priority of China Patent Application No. 201810188767.X, filed Mar. 7, 2018, the entirety of which are incorporated by reference herein.

BACKGROUND

Technical Field

The disclosure relates to an electromagnetic driving mechanism, and in particular to an electromagnetic driving mechanism which is miniaturized by insert molding.

Description of the Related Art

The volume requirements on electronic products are becoming increasingly stricter. If the volume needs to be reduced, the inner electronic components have to be combined into a single element as much as possible. In addition, if an integrated circuit (IC) element needs to be disposed on the printed circuit board (PCB), the integrated circuit element may protrude from the printed circuit board and occupy the space over the printed circuit board. Therefore, it is difficult to miniaturize the mechanism, and the assembly of other elements of the mechanism can easily be affected.

BRIEF SUMMARY

Some embodiments of the disclosure provide an electromagnetic driving mechanism, including: a housing, a circuit unit, an electromagnetic driving assembly, and a sensing element. The circuit unit is connected to the housing, and has a plastic material and a circuit element, wherein the plastic material is formed on and covers an outer surface of the circuit element by insert molding. The electromagnetic driving assembly is disposed in the housing for forcing the optical element to move relative to the circuit unit. The sensing element is disposed on the circuit unit, and electrically connected to the circuit element for detecting the displacement of the optical element relative to the circuit unit.

In an embodiment, the sensing element protrudes from the top surface of the circuit unit.

In an embodiment, the sensing element is aligned with the top surface of the circuit unit.

In an embodiment, the sensing element is lower than the top surface of the circuit unit.

In an embodiment, a recess is formed in the circuit unit, and the sensing element is disposed in the recess.

In an embodiment, the electromagnetic driving mechanism further includes a protective material disposed in the recess, and the protective material is configured to protect the sensing element.

In an embodiment, the protective material covers the top surface of the sensing element.

In an embodiment, an opening is formed in the plastic material, the circuit element is exposed from the opening, and the opening and the sensing element are disposed on opposite sides of the circuit element.

In an embodiment, the position of the opening corresponds to the sensing element.

In an embodiment, the electromagnetic driving mechanism further includes a filling material disposed in the opening.

In an embodiment, the circuit element has a flat-plate structure, and the flat-plate structure is embedded in the plastic material.

In an embodiment, a first central axis of the flat-plate structure deviates from a second central axis of the circuit unit.

In an embodiment, the electromagnetic driving mechanism further includes a circuit board disposed over the circuit unit, and the circuit board covers the sensing element.

In an embodiment, the electromagnetic driving mechanism further includes a coil disposed in the circuit board, and when observed from the optical axis direction of the optical element, the coil and the recess at least partially overlap.

In an embodiment, before the plastic material is formed on and covers the outer surface of the circuit element by insert molding, the sensing element is electrically connected to the circuit element.

Some embodiments of the disclosure provide an electromagnetic driving mechanism, including: a housing, a circuit unit, an electromagnetic driving assembly, and a sensing element. The circuit unit is connected to the housing, and has a plastic material and a circuit element, wherein the plastic material is formed on and covers an outer surface of the circuit element by insert molding. The electromagnetic driving assembly is disposed in the housing for forcing the optical element to move relative to the circuit unit. The sensing element is partially disposed in a notch or a through hole of the circuit unit, and is configured to detect the displacement of the optical element relative to the circuit unit, wherein when observed from a direction that is perpendicular to the optical axis of the optical element, the sensing element and the circuit element at least partially overlap.

In an embodiment, the surface of the sensing element faces the optical element, the surface of the circuit unit is in contact with a circuit board of the electromagnetic driving assembly, and the surface of the sensing element and the surface of the circuit unit are substantially on the same plane.

In an embodiment, the circuit board is concurrently in contact with the circuit unit and the sensing element.

In an embodiment, the circuit board and the circuit element are electrically connected by soldering or welding.

In an embodiment, the circuit element has a first section extending along a direction which is not parallel to the optical axis of the optical element, and when observed from a direction which is perpendicular to the optical axis of the optical element, the sensing element and the first section partially overlap.

In an embodiment, the circuit element has a second section extending along a direction which is substantially parallel to the optical axis of the optical element, and when observed from a direction which is perpendicular to the optical axis of the optical element, the sensing element and the second section partially overlap.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The electromagnetic driving mechanisms of some embodiments of the present disclosure are described in the following description. However, it should be appreciated that the following detailed description of some embodiments of the disclosure provides various concepts of the invention which may be performed in specific backgrounds that can vary widely. The specific embodiments disclosed are provided merely to clearly describe the usage of the invention by some specific methods without limiting the scope of the invention.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
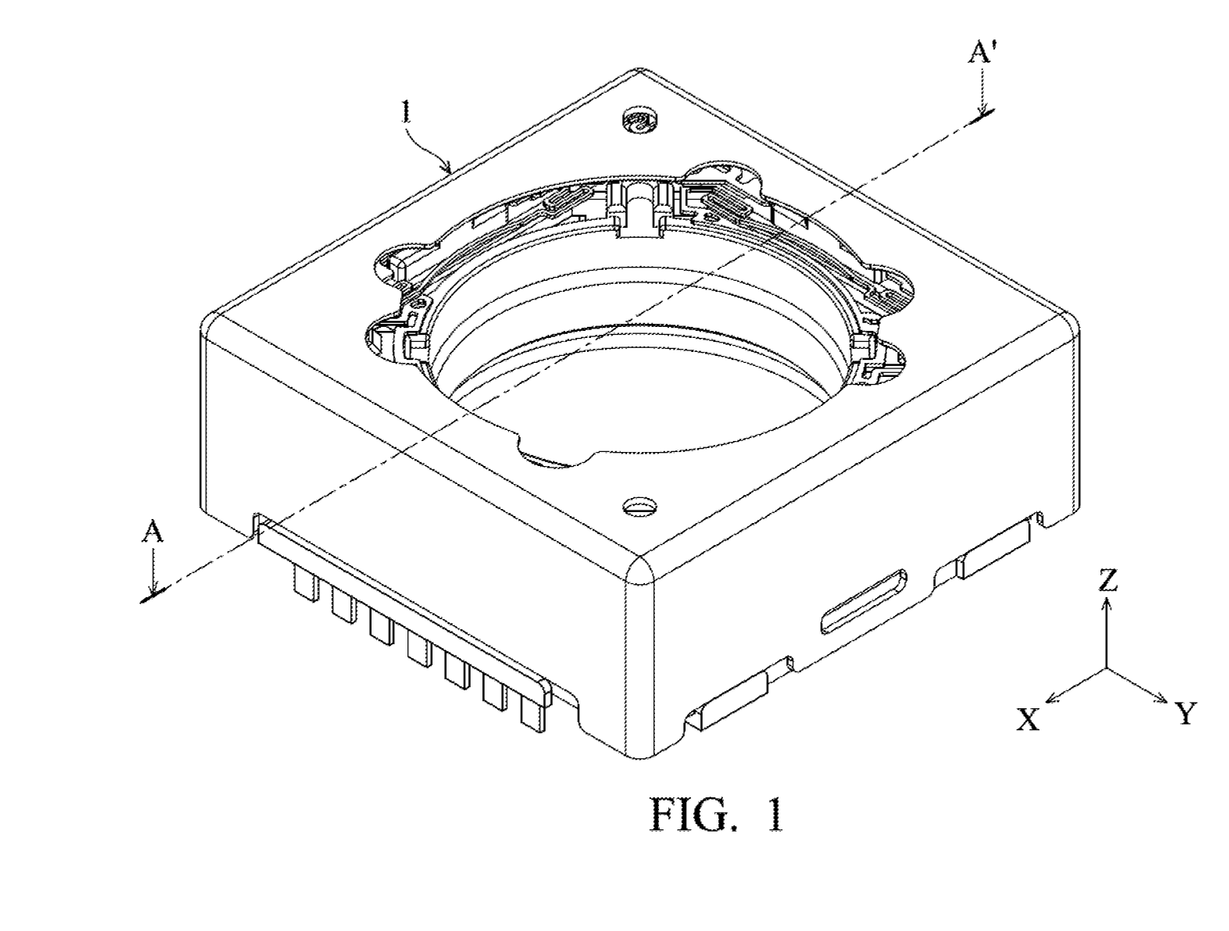
FIG. 1 is a schematic perspective view illustrating an electromagnetic driving mechanism in accordance with an embodiment of the present disclosure.
Figure 2:
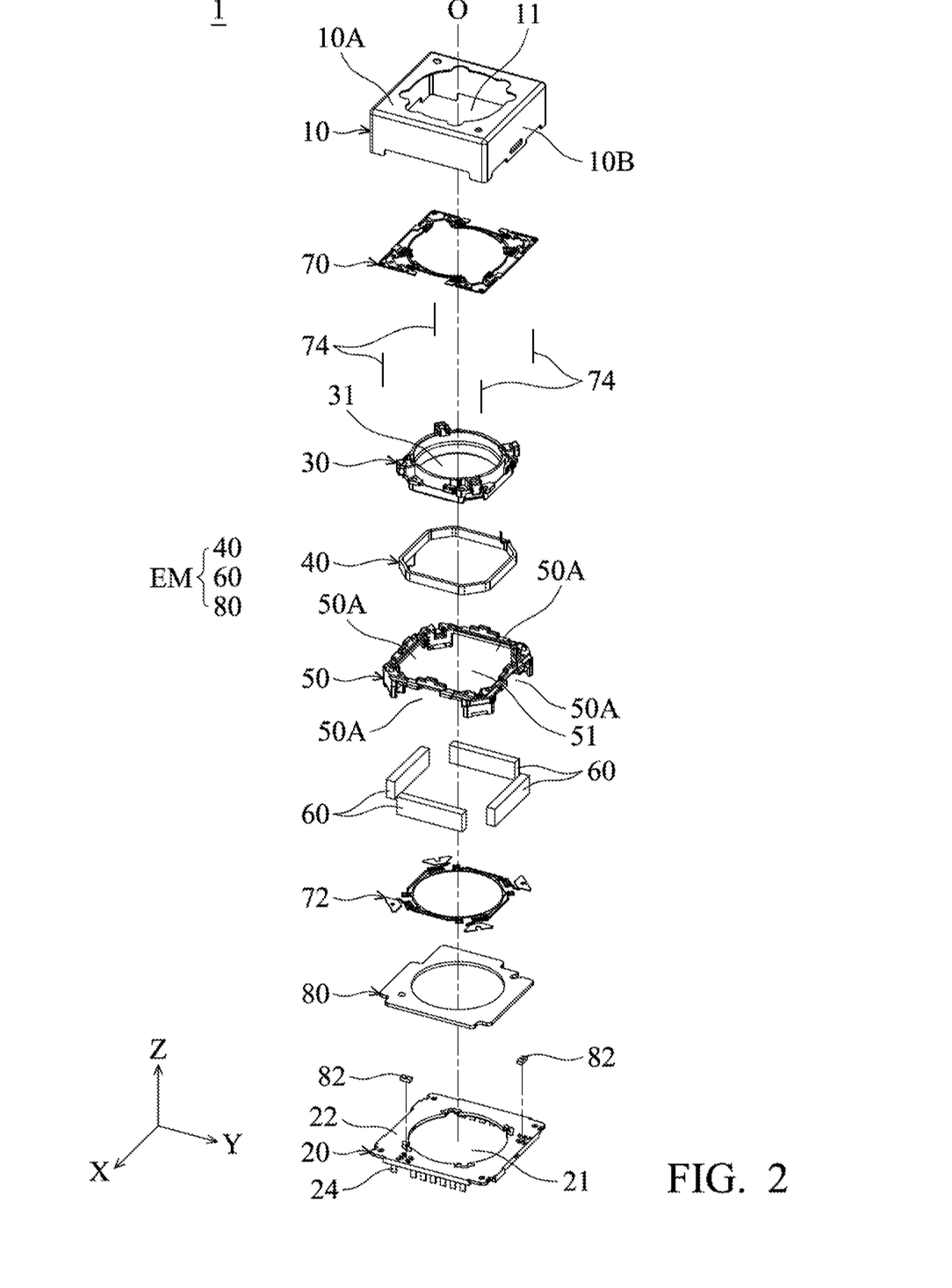
FIG. 2 is an exploded view illustrating the electromagnetic driving mechanism in FIG. 1.
Figure 3:
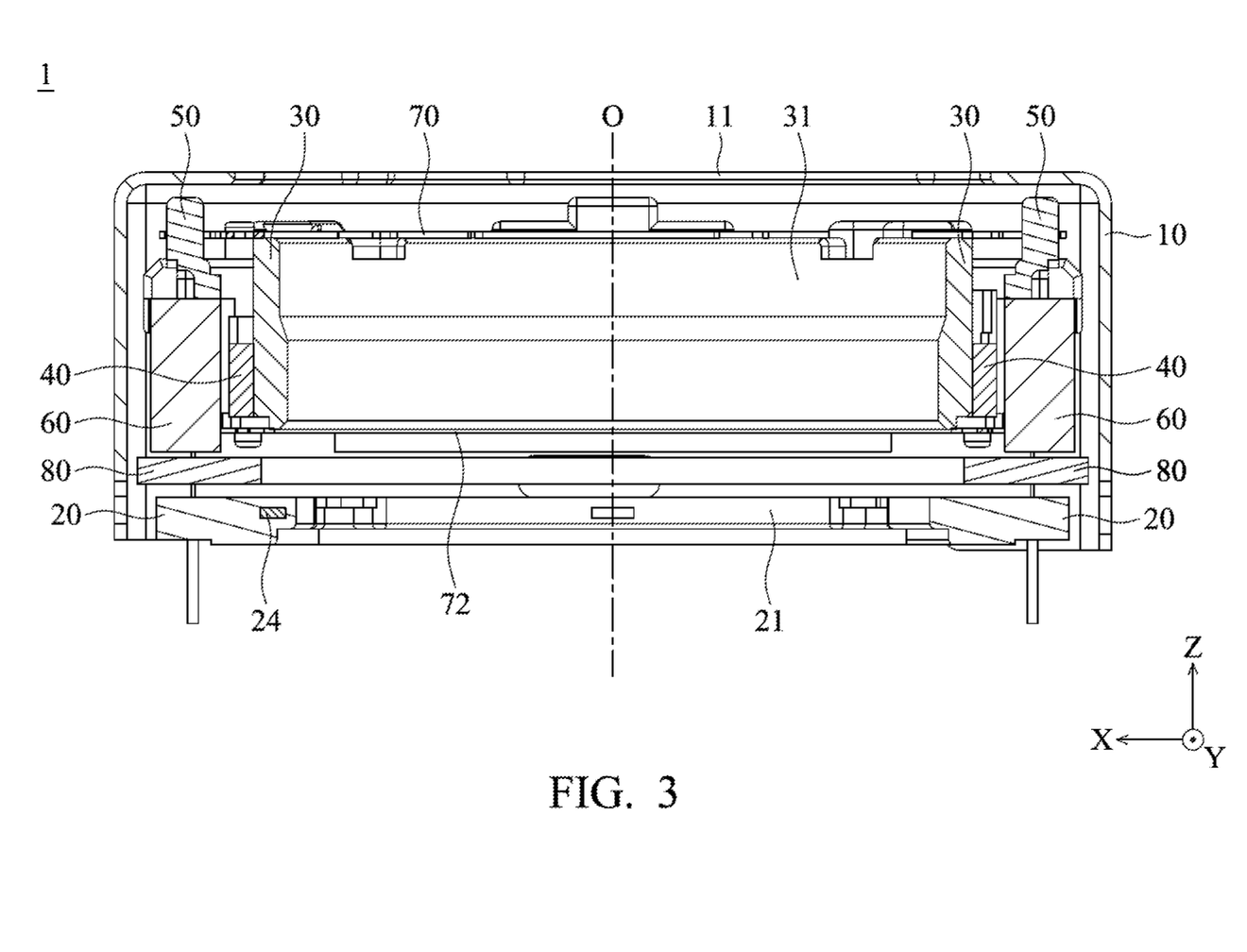
FIG. 3 is a cross-sectional view illustrating the electromagnetic driving mechanism along line A-A' in FIG. 1.

Referring to FIGS. 1 to 3, wherein FIG. 1 is a schematic perspective view illustrating an electromagnetic driving mechanism 1 in accordance with an embodiment of the present disclosure, FIG. 2 is an exploded view illustrating the electromagnetic driving mechanism 1 in FIG. 1, and FIG. 3 is a cross-sectional view illustrating the electromagnetic driving mechanism 1 along line A-A' in FIG. 1. It should be noted that in this embodiment, the electromagnetic driving mechanism 1 may be, for example, disposed in the electronic devices with camera function, and can perform auto-focusing (AF) and optical image stabilization (OIS) functions.

As shown in FIGS. 1 to 3, the electromagnetic driving mechanism 1 mainly includes a housing 10, a circuit unit 20, a holder 30, a coil 40, a frame 50, four magnets 60, an upper leaf spring 70, a lower leaf spring 72, four suspension wires 74, a circuit board 80, and two sensing elements 82.

The housing 10 has a hollow structure, which has a top wall 10A, and four sidewalls 10B, and the housing 10 can be connected to the circuit unit 20. It should be appreciated that openings 11 and 21 are respectively formed on the housing 10 and the circuit unit 20. The center of the opening 11 corresponds to an optical axis O of an optical element (not shown). The opening 21 corresponds to an image-sensing element (not shown) disposed outside the electromagnetic driving mechanism 1, and thereby the optical element disposed in the electromagnetic driving mechanism 1 can perform a focusing function with the image-sensing element in the direction of the optical axis O. The optical element may include a lens unit or any other suitable optical element.

The circuit unit 20 includes a circuit element 24. In this embodiment, the circuit element 24 is electrically connected to a driving unit (not shown) disposed outside the electromagnetic driving mechanism 1, and the circuit element 24 is configured to perform auto-focusing (AF) and optical image stabilization (OIS) functions.

The circuit unit 20 further includes a plastic material 22, wherein the plastic material 22 is formed on and covers an outer surface of the circuit element 24 by insert molding.

The frame 50 has an opening 51 and four cavities 50A, wherein the cavities 50A respectively correspond to the four sidewalls 10B of the housing 10. Four magnets 60 can be fixed in the four cavities 50A. In some embodiments, the four magnets 60 can also be fixed in the four corners of the frame 50, and the magnets 60 have a longitudinal shape.

The holder 30 has a hollow structure, and a through hole 31 is formed therein, wherein the optical element is secured in the through hole 31, and the coil 40 winds around the outer peripheral surface of the holder 30.

In this embodiment, the four magnets 60, the coil 40, and the circuit board 80 constitute an electromagnetic driving assembly EM. It should be noted that, in some embodiments, the positions of the magnets and the coil are interchangeable. That is, in some embodiments, one or more coil may be fixed onto the frame 50, the magnets corresponding to the coil are disposed on the outer peripheral surface of the holder 30

As shown in FIGS. 2 and 3, the holder 30 and the optical element disposed therein are movably disposed in the frame 50. To be more specific, the holder 30 may be suspended in the center of the frame 50 through the upper leaf spring 70 and the lower leaf spring 72, which are made of metal materials. When a current is applied to the coil 40, an electromagnetic force may be generated by the coil 40 and the magnets 60 to force the holder 30 and the optical element to move along Z-axis direction relative to the frame 50.

The outer peripheral portions of the upper leaf spring 70 and the lower leaf spring 72 are respectively connected to the upper and lower sides of the frame 50. The inner peripheral portions of the upper leaf spring 70 and the lower leaf spring 72 are respectively connected to the upper and lower sides of the holder 30. Therefore, the holder 30 can be disposed and suspended in the frame 50.

The circuit board 80 is, for example, a printed circuit board. Four coils 84 (shown in FIG. 10B) are disposed in the circuit board 80, and respectively correspond to each of the positions of the four magnets 60.

One end of each of the four suspension wires 74 is connected to the circuit unit 20, the other end is connected to the upper leaf spring 70, and thereby the frame 50 and the holder 30 and the optical element disposed therein are suspended in the housing 10. The material of the suspension wires 74 may include, for example, metal.

It should be noted that electrical signals may be transmitted to the coil 40 and the coils 84 in the circuit board 80 through the circuit element 24. In addition, the circuit element 24 may also transmit electrical signals to the coil 40 through the suspension wires 74 and the upper leaf spring 70, and thereby the movements of the holder 30 in the X-axis, Y-axis and Z-axis directions are controlled.

As shown in FIG. 2, the sensing elements 82, which are electrically connected to the circuit element 24, are respectively mounted on different sides of the circuit unit 20. The sensing elements 82 are, for example, Hall effect sensors, magnetoresistive (MR) sensors, or fluxgates, and thereby the sensing elements 82 may be configured to detect the magnets 60 on the frame 50 to obtain the displacement of the frame 50 and the holder 30 relative to the circuit unit 20 in the X-axis and Y-axis directions. For instance, after the plastic material 22 is formed on and covers the outer surface of the circuit element 24 by insert molding, the sensing elements 82 may be electrically connected (such as by welding) to the circuit element 24. In an embodiment, the sensing elements 82 may also be electrically connected (such as by welding) to the circuit element 24 before the plastic material 22 is formed on and covers the outer surface of the circuit element 24 by insert molding.

It should be noted that the circuit element 24 may generate and provide electrical signals to the coils 84 in the circuit board 80, and an electromagnetic driving force is generated between the coils 84 and the magnet 60 to force the frame 50 to move along a direction (parallel to XY-plane) which is perpendicular to the optical axis O. The displacement is compensated for so that the OIS function is achieved.

Figure 4:
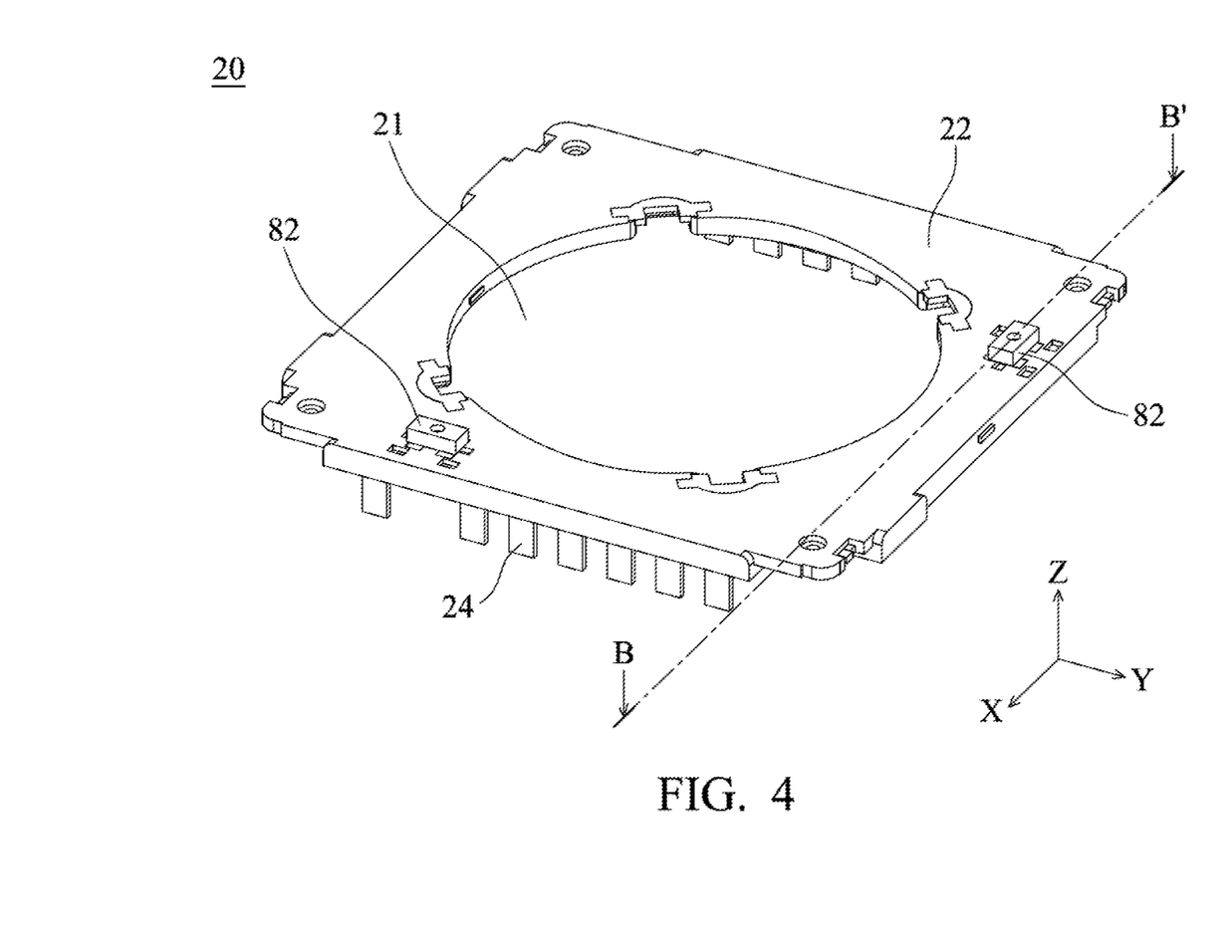
FIG. 4 is a schematic perspective view illustrating a circuit unit and sensing elements shown in FIG. 2 after assembly.
Figure 5:
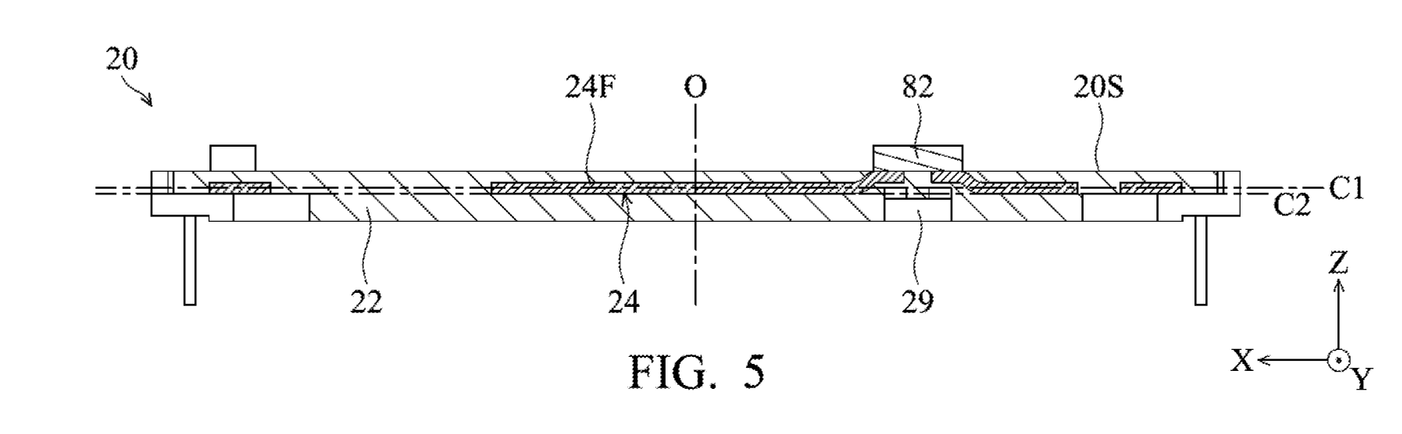
FIG. 5 is a cross-sectional view illustrating the electromagnetic driving mechanism along line B-B' in FIG. 4.

Referring to FIGS. 4 and 5, FIG. 4 is a schematic perspective view illustrating the circuit unit 20 shown in FIG. 2 after assembly, and FIG. 5 is a cross-sectional view illustrating the electromagnetic driving mechanism along line B-B' in FIG. 4. In this embodiment, the welding places between the sensing elements 82 and the circuit element 24 are substantially aligned with the top surface 20S of the circuit unit 20. The sensing elements 82 protrude from the top surface 20S of the circuit unit 20, and thereby the welding operation may be facilitated, wherein the position of one of the sensing elements 82 corresponds to an opening 29 on a bottom side of the circuit unit 20. In addition, the circuit element 24 has a flat-plate structure 24F extending in a horizontal direction. The horizontal direction is perpendicular to the optical axis O (Z-axis direction) of the optical element. It is shown in FIG. 5 that the flat-plate structure 24F is embedded in the plastic material 22, and the flat-plate structure 24F has a first central axis C1 that is perpendicular to the optical axis O direction. In addition, the flat-plate-shaped circuit unit 20 also has a second central axis C2 that is perpendicular to the optical axis O direction, wherein the first central axis C1 is higher than the second central axis C2. That is, the first central axis C1 is disposed between the sensing elements 82 and the second central axis C2.

Figure 6A:
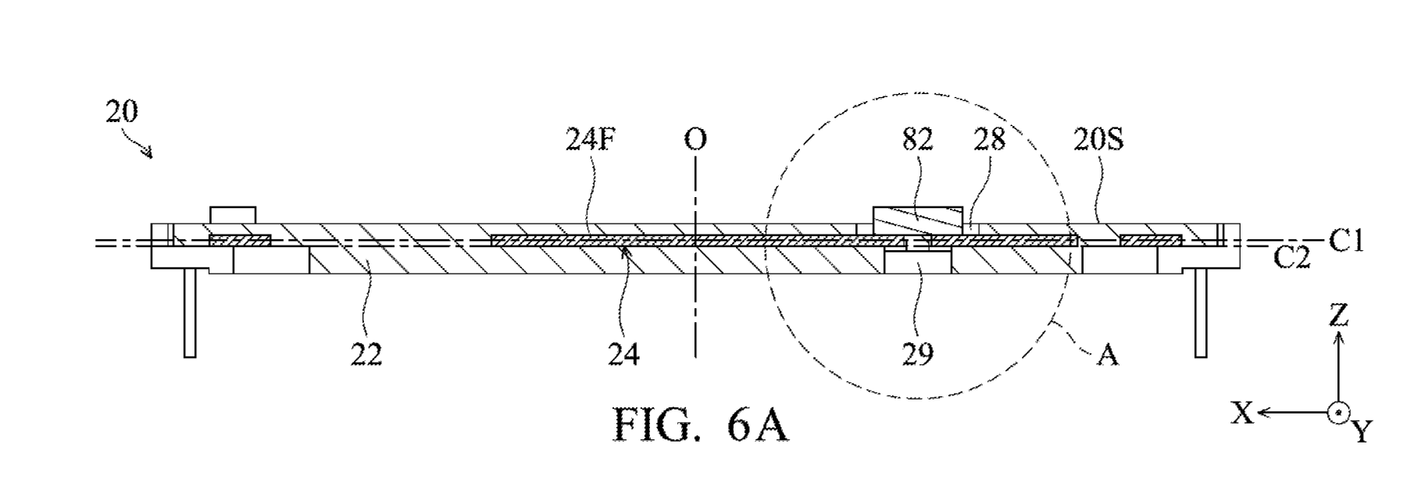
FIG. 6A is a cross-sectional view illustrating the circuit unit in accordance with another embodiment of the present disclosure.
Figure 6B:
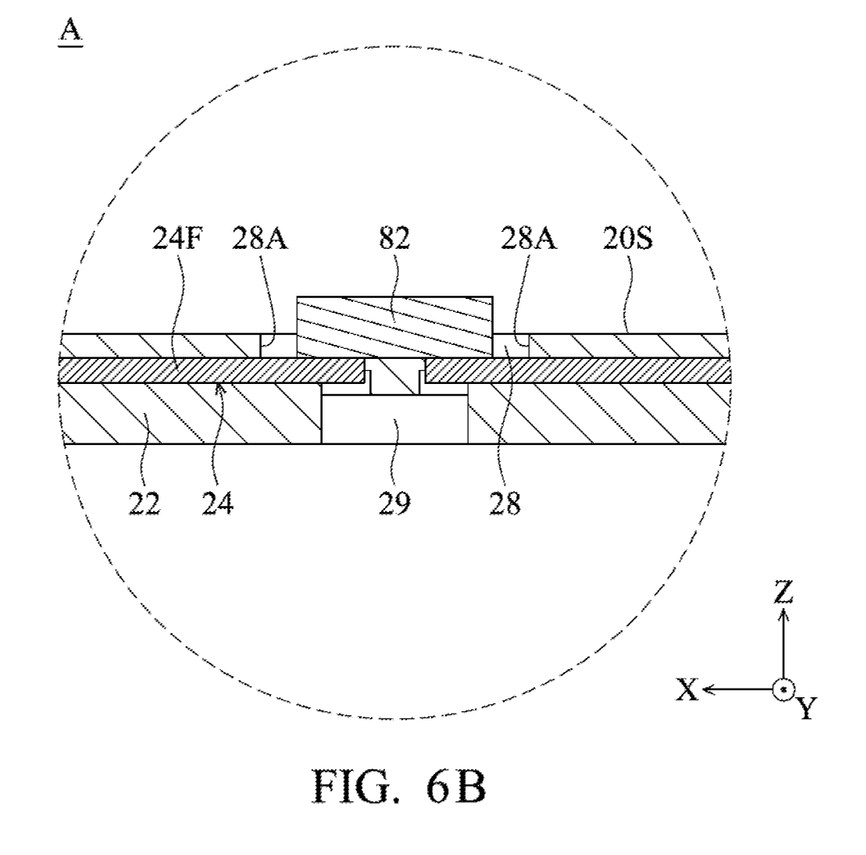
FIG. 6B is an enlarged view illustrating a region A shown in FIG. 6A.

Referring to FIGS. 6A and 6B, wherein FIG. 6A is a cross-sectional view illustrating the circuit unit in accordance with another embodiment of the present disclosure, and FIG. 6B is an enlarged view illustrating a region A shown in FIG. 6A. In this embodiment, a recess 28 is formed in the circuit unit 20. The sensing element 82 is disposed in the recess 28, and thereby the position of the sensing element 82 is lowered. That way, not only can the overall thickness of the circuit unit 20 be reduced, but also the flatness of the circuit element 24 can be enhanced to improve the assembly accuracy of the mechanism. In this embodiment, since the sidewalls 28A protect the sensing element 82, the sensing element 82 is prevented from colliding with ambient components, wherein the distance between the sidewalls 28A and the sensing element 82 may be in a range of 0 to about 2 mm. Furthermore, a filling material (such as a resin) may also be filled between the sidewalls 28A and the sensing element 82 to enhance the mechanical strength.

In another embodiment, the sensing element 82 may also be partially disposed in a notch or a through hole formed in the circuit unit 20. Therefore, when observed from the direction perpendicular to the optical axis O of the optical element, the sensing element 82 and the circuit element 24 partially overlap. In other words, when observed from the XY-plane direction, it is found that the sensing element 82 and the circuit element 24 partially overlap. In this embodiment, the sensing element 82 is partially embedded in the circuit unit 20, and thereby the space for arranging the sensing element 82 can be saved to achieve the miniaturization of the electromagnetic driving mechanism.

Figure 7:
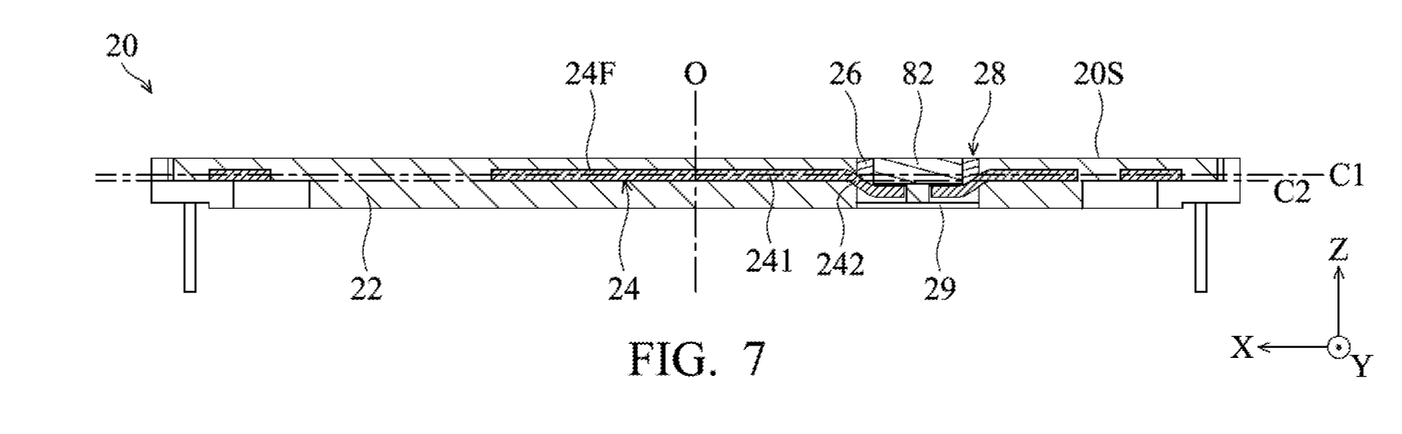
FIG. 7 is a cross-sectional view illustrating the circuit unit in accordance with another embodiment of the present disclosure.

Referring to FIG. 7, in another embodiment, the surface of the sensing element 82 faces the optical element, the surface of the circuit unit 20 is in contact with the circuit board 80 (See FIGS. 2 and 10A) of the electromagnetic driving assembly EM, and the surface of the sensing element 82 and the surface of the circuit unit 20 are substantially on the same plane. In other words, the top surface of the sensing element 82 is aligned with the top surface 20S of the circuit unit 20, and a protective material 26 covers the side faces of the sensing element 82. Therefore, the circuit board 80 disposed over the circuit unit 20 would concurrently contact the circuit unit 20 and the sensing element 82, and thereby the sensing element 82 is less damaged. The overall structural strength is enhanced, and the electromagnetic driving mechanism can be further miniaturized.

Figure 8:
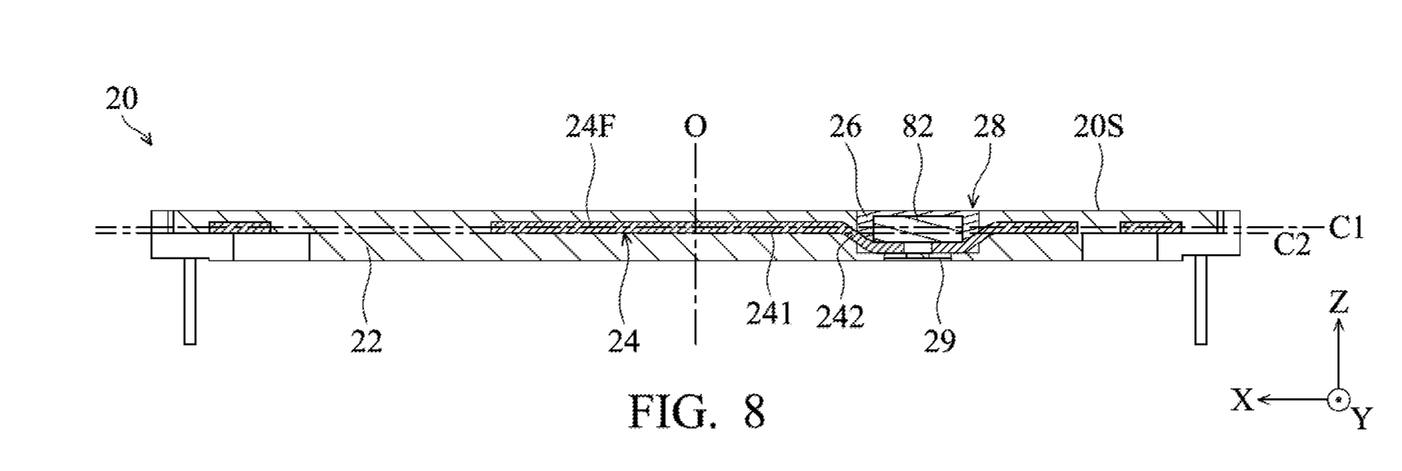
FIG. 8 is a cross-sectional view illustrating the circuit unit in accordance with another embodiment of the present disclosure.

Referring to FIG. 8, in another embodiment, the top surface of the sensing element 82 may be lower than the top surface 20S of the circuit unit 20, and the protective material 26 covers the top surface and side faces of the sensing element 82. Therefore, the sensing element 82 is prevented form colliding with foreign objects and being damaged. In addition, different materials may also be doped in the protective material 26 as required to change the properties of the protective material 26. For example, an elastic material or a shielding material is doped so that the protective material 26 has a better damping effect or electromagnetic-wave blocking effect.

Figure 9:
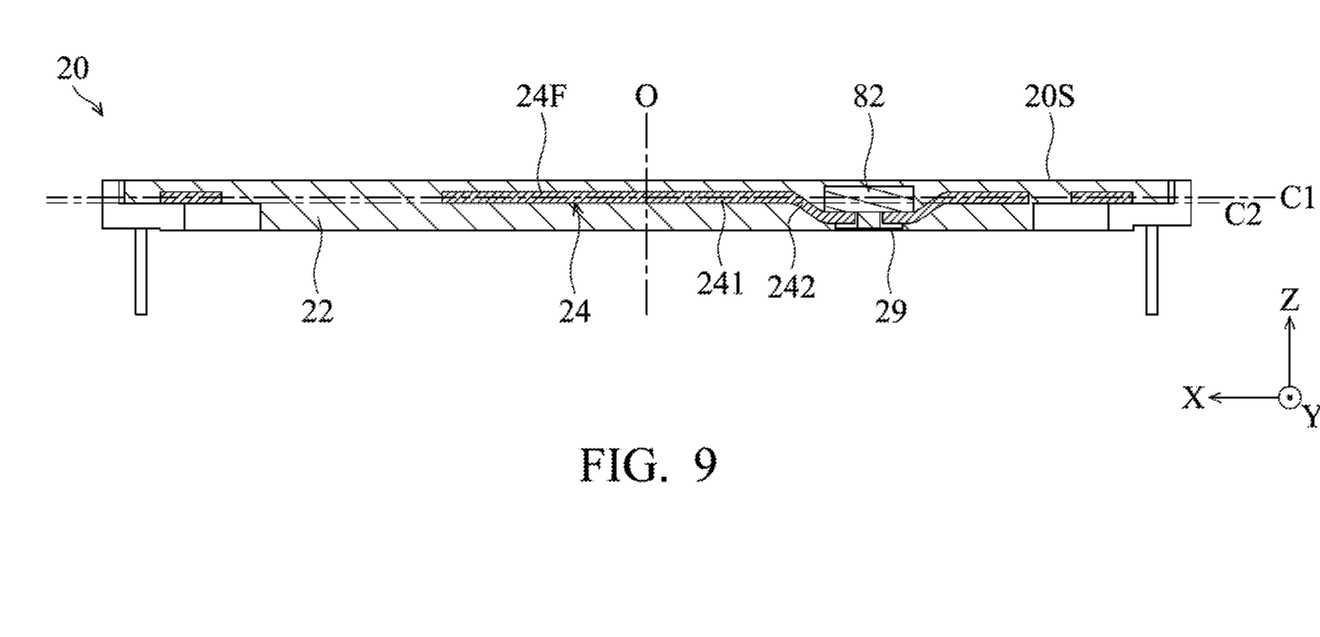
FIG. 9 is a cross-sectional view illustrating the circuit unit in accordance with another embodiment of the present disclosure.

Referring to FIG. 9, in another embodiment, the sensing element 82 may also be entirely embedded in the plastic material 22 by insert molding. Therefore, not only can miniaturization of the electromagnetic driving mechanism be achieved, but the manufacturing process can also be simplified to reduce the required time and cost of the process.

It should be noted that in the embodiments shown in FIGS. 7 to 9, the circuit element 24 has a first section 241 and a second section 242, wherein the first section 241 extends along a direction (such as the XY-plane direction) which is not parallel to the optical axis O of the optical element, and the second section 242 extends along a direction which is substantially parallel to the optical axis O of the optical element. When observed from the direction perpendicular to the optical axis O of the optical element, the sensing element 82 partially overlaps the first section 241 and the second section 242, respectively. The difference between the above-mentioned structure and the printed circuit board traditionally used is that traditional printed circuit board is disposed on one lateral side of the electromagnetic driving mechanism, and the inner circuit extends along the optical axis O direction. The circuit element 24 has a circuit extending along the direction which is perpendicular to the optical axis O direction, facilitating to reduce the size of the electromagnetic driving mechanism in the horizontal direction.

Figure 10A:
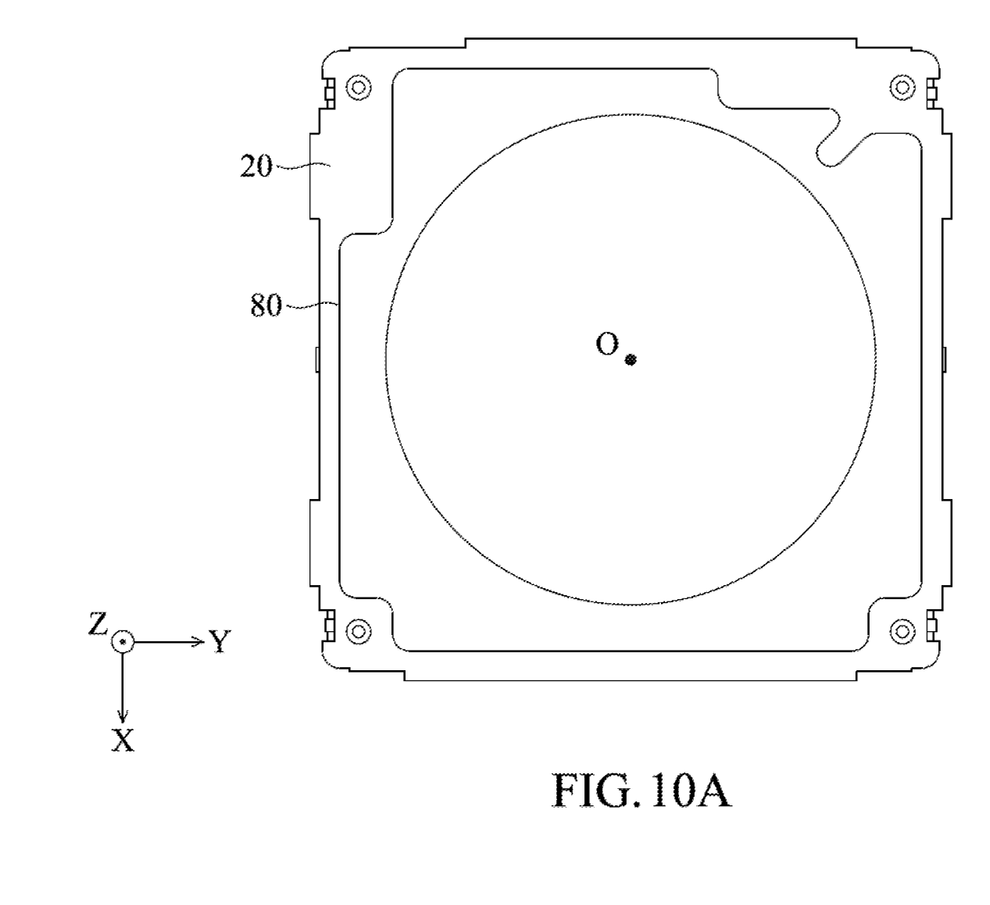
FIG. 10A is a schematic view illustrating relative positions between the circuit unit and the circuit board in accordance with an embodiment of the present disclosure.
Figure 10B:
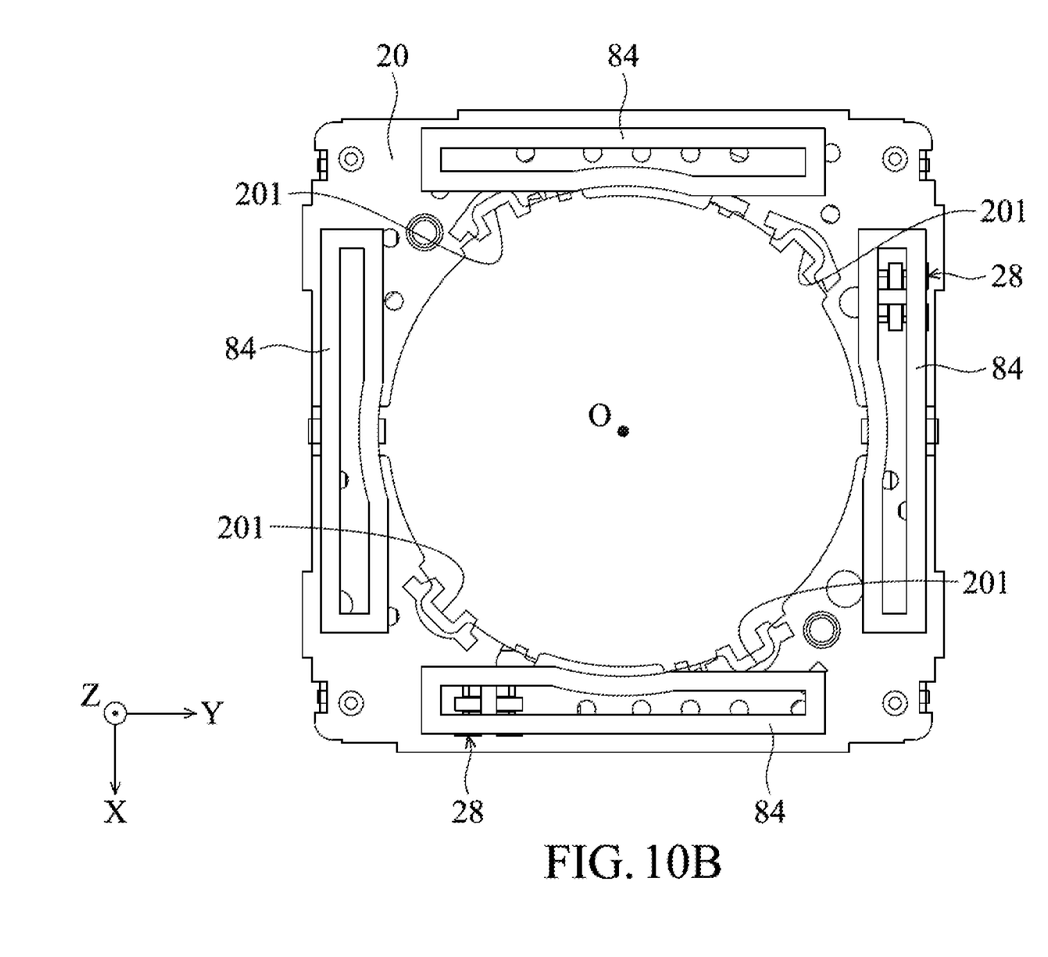
FIG. 10B is a schematic view illustrating relative positions between the circuit unit and the coils in accordance with an embodiment of the present disclosure.

Referring to FIGS. 10A and 10B together, FIG. 10A is a schematic view illustrating relative positions between the circuit unit 20 and the circuit board 80 in accordance with an embodiment of the present disclosure, and FIG. 10B is a schematic view illustrating relative positions between the circuit unit 20 and the coils 84 in accordance with an embodiment of the present disclosure. As shown in FIG. 10A, the circuit board 80 is disposed over the circuit unit 20, and the circuit board 80 covers the sensing elements 82 (See FIG. 10B). In this embodiment, the circuit board 80 and the circuit element 24 are electrically connected by soldering or welding. As shown in FIG. 10B, the circuit board 80 is electrically connected to the circuit element 24 through electrical contacts 201, which are disposed on the inner edge of the circuit unit 20. In this embodiment, the four electrical contacts 201 are arranged around the optical axis O in a symmetrical way.

It should be noted that the circuit board 80 is not shown in FIG. 10B for purpose of clarification, and only the coils 84, which are embedded in the circuit board 80, are shown. Since the sensing element 82 is disposed in the recess 28 of the circuit unit, or entirely embedded in the circuit unit 20 in some embodiments of the present disclosure, available space over the circuit unit 20 for the coils 84 is increased. That is, the size of the coils 84 may be enlarged to enhance the electromagnetic driving force. It is clearly shown in FIG. 10B that when observed from the optical axis O direction (Z-axis direction) of the optical element, the coils 84 and the recess 28 at least partially overlap.

Figure 11:
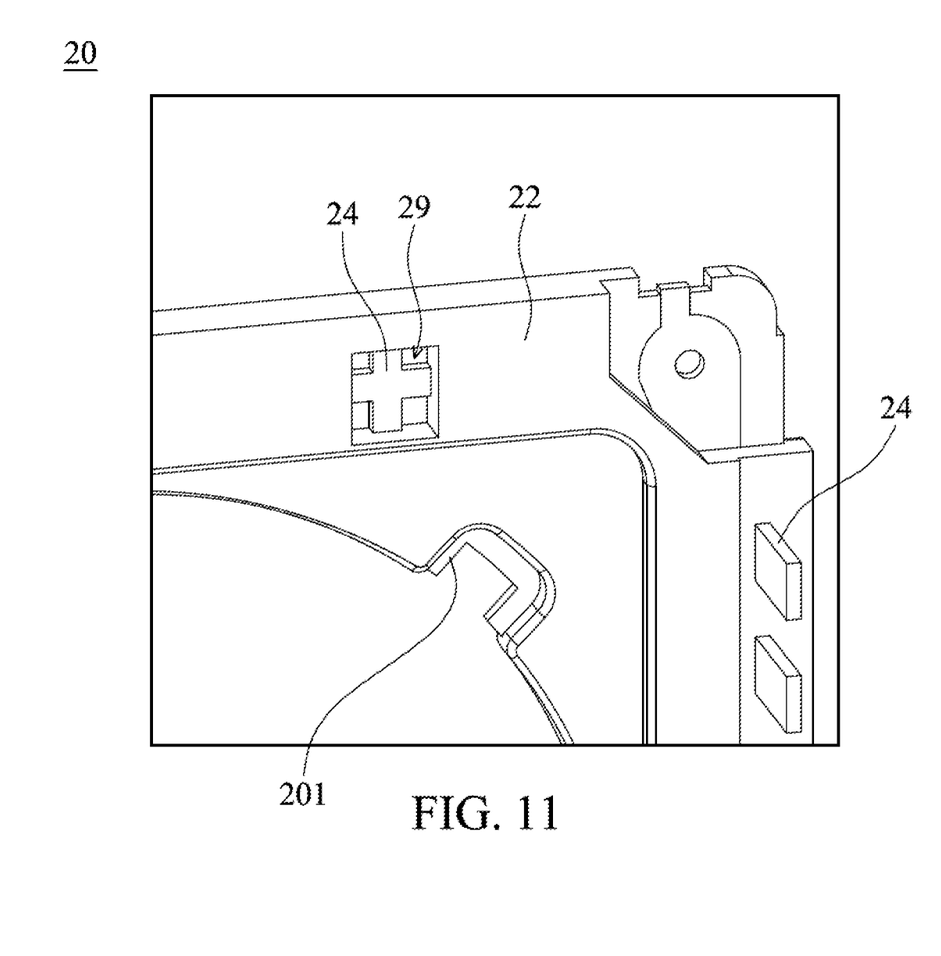
FIG. 11 is a partial schematic view illustrating the structural configuration of the opening of the circuit unit in accordance with an embodiment of the present disclosure.

In addition, as shown in FIG. 11, an opening 29 is formed on the bottom side of the circuit unit 20 in each of the aforementioned embodiments, and a filling material (not shown) may be disposed in the opening 29. The purpose of the opening 29 is for enhancing the cooling efficiency to facilitate soldering or welding the circuit unit 20 and the circuit element 24. After the insert molding process, the circuit element 24 is exposed from the opening 29. Then, the filling material may be applied in the opening 29 to protect the circuit element 24. Therefore, the foreign objects, which are generated during connecting the circuit unit 20 and the circuit element 24, would less move to other portions of the mechanism, and the stability of the mechanism can be enhanced at the same time. The opening 29 and the sensing element 82 are respectively disposed on the top and bottom sides of the circuit element 24, and the position of the opening 29 corresponds to the sensing element 82.

In some other embodiments of the present disclosure, the circuit element 24 may also be embedded in any above-mentioned features that metallic circuit may be embedded therein. For example, the circuit element 24 may be embedded in the housing 10, the frame 50, or the holder 30 shown in FIG. 2 to achieve the miniaturization effect to the driving mechanism.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as may perform substantially the same function in the aforementioned embodiments and obtain substantially the same result may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

Although the preferable embodiments of the present disclosure have been described above, however, these embodiments are not intended to limit the present disclosure. Those skilled in the art may make some changes and alterations without departing from the spirit and scope of the present disclosure. Therefore, the scope of the present disclosure may be defined referring to the appended claims. Furthermore, each of the appended claims constructs an individual embodiment, and the scope of the present disclosure also includes every combination of the appended claims and embodiments.

What is claimed is:

1. An electromagnetic driving mechanism, comprising:
   a housing;
   a circuit unit connected to the housing, wherein the circuit unit has a plastic material and a circuit element, and the plastic material is formed on and covers an outer surface of the circuit element by insert molding;
   an electromagnetic driving assembly disposed in the housing for forcing an optical element to move relative to the circuit unit; and
   a sensing element disposed on the circuit unit and electrically connected to the circuit element for detecting the displacement of the optical element relative to the circuit unit,
   wherein the circuit element has a first section extending along a direction that is not parallel to an optical axis of the optical element, and when observed from a direction that is perpendicular to the optical axis of the optical element, the sensing element and the first section partially overlap.

2. The electromagnetic driving mechanism as claimed in claim 1, wherein the sensing element protrudes from a top surface of the circuit unit.

3. The electromagnetic driving mechanism as claimed in claim 1, wherein the sensing element is aligned with the top surface of the circuit unit.

4. The electromagnetic driving mechanism as claimed in claim 1, wherein the sensing element is lower than the top surface of the circuit unit.

5. The electromagnetic driving mechanism as claimed in claim 1, wherein a recess is formed in the circuit unit, and the sensing element is disposed in the recess.

6. The electromagnetic driving mechanism as claimed in claim 5, further comprising a protective material disposed in the recess, wherein the protective material is configured to protect the sensing element.

7. The electromagnetic driving mechanism as claimed in claim 6, wherein the protective material covers a top surface of the sensing element.

8. The electromagnetic driving mechanism as claimed in claim 5, further comprising a circuit board disposed over the circuit unit, wherein the circuit board covers the sensing element.

9. The electromagnetic driving mechanism as claimed in claim 8, further comprising a coil disposed in the circuit board, wherein when observed from the optical axis direction of the optical element, the coil and the recess at least partially overlap.

10. The electromagnetic driving mechanism as claimed in claim 1, wherein an opening is formed in the plastic material, the circuit element is exposed from the opening, and the opening and the sensing element are disposed on opposite sides of the circuit element.

11. The electromagnetic driving mechanism as claimed in claim 10, wherein the position of the opening corresponds to the sensing element.

12. The electromagnetic driving mechanism as claimed in claim 10, further comprising a filling material disposed in the opening.

13. The electromagnetic driving mechanism as claimed in claim 1, wherein the circuit element has a flat-plate structure, and the flat-plate structure is embedded in the plastic material.

14. The electromagnetic driving mechanism as claimed in claim 13, wherein a first central axis of the flat-plate structure deviates from a second central axis of the circuit unit.

15. An electromagnetic driving mechanism, comprising:
a housing;
a circuit unit connected to the housing, wherein the circuit unit has a plastic material and a circuit element, and the plastic material is formed on and covers an outer surface of the circuit element by insert molding;
an electromagnetic driving assembly disposed in the housing for forcing an optical element to move relative to the circuit unit; and
a sensing element partially disposed in a notch or a through hole of the circuit unit for detecting the displacement of the optical element relative to the circuit unit, wherein when observed from a direction that is perpendicular to an optical axis of the optical element, the sensing element and the circuit element partially overlap,
wherein the circuit element has a first section extending along a direction that is not parallel to the optical axis of the optical element, and when observed from the direction that is perpendicular to the optical axis of the optical element, the sensing element and the first section partially overlap.

16. The electromagnetic driving mechanism as claimed in claim 15, wherein a surface of the sensing element faces a surface of the optical element, a surface of the circuit unit is in contact with a circuit board of the electromagnetic driving assembly, and the surface of the sensing element and the surface of the circuit unit are substantially on the same plane.

17. The electromagnetic driving mechanism as claimed in claim 16, wherein the circuit board is concurrently in contact with the circuit unit and the sensing element.

18. The electromagnetic driving mechanism as claimed in claim 17, wherein the circuit board and the circuit element are electrically connected by soldering or welding.

19. The electromagnetic driving mechanism as claimed in claim 15, wherein the circuit element has a second section extending along a direction that is substantially parallel to the optical axis of the optical element, and when observed from the direction that is perpendicular to the optical axis of the optical element, the sensing element and the second section partially overlap.

* * * * *